United States Patent [19]

McLaughlin

[11] Patent Number: 5,885,688

[45] Date of Patent: Mar. 23, 1999

[54] STEEL REINFORCED FILLED POLYMER TORQUE ROD

[75] Inventor: Ronald J. McLaughlin, Maumee, Ohio

[73] Assignee: The Pullman Company, Milan, Ohio

[21] Appl. No.: 773,142

[22] Filed: Dec. 26, 1996

[51] Int. Cl.⁶ .............................. B32B 3/10; B60G 11/18; B60S 9/02

[52] U.S. Cl. .......................... 428/131; 428/134; 428/136; 80/721; 80/763.1

[58] Field of Search ..................................... 428/131, 134, 428/136; 280/DIG. 7, 721, 763.1

[56] References Cited

U.S. PATENT DOCUMENTS

| | | | |
|---|---|---|---|
| 4,359,122 | 11/1982 | Albee | 180/74 |
| 4,891,399 | 1/1990 | Ohkawa et al. | 523/200 |

FOREIGN PATENT DOCUMENTS

01011163 A2   1/1993   Japan .

*Primary Examiner*—S. Mark Clardy
*Assistant Examiner*—Alton Pryor
*Attorney, Agent, or Firm*—Harness, Dickey & Pierce PLC

[57] ABSTRACT

A steel reinforced filled polymer torque rod and method of making the same, is disclosed. The torque rod includes a stamped metal reinforcement plate having first and second bores therethrough which are surrounded by first and second annular flanges, respectively. The stamped metal reinforcement plate also includes a depression extending axially between the first connector bore and the second connector bore, and an end flange surrounding an end surface of the reinforcement plate. The torque rod also includes a polymer shell which encases and conforms to the stamped metal reinforcement plate. The polymer shell includes a first connector portion which encases the first connector bore and first annular flange, a second connector portion which encases the second connector bore and the second connector flange, an end wall which encases the end flange, and a number of side walls which encase the depression.

11 Claims, 3 Drawing Sheets

STEEL REINFORCED FILLED POLYMER TORQUE ROD

BACKGROUND OF THE INVENTION

The present invention relates to torque rods, and more particularly to steel reinforced molded or filled polymer torque rods for use as automobile track bars, stabilizer rods, control links, and truck cab rods in the transportation and other industries.

Torque rods are used in the trucking industry to stabilize vehicle axles relative to a vehicle frame. A typical torque rod is a rod or link with connectors at each end. The connector designs vary, but could include ball studs, metal tubes, or straddle bars. In a typical application, one end of the torque rod is connected to a vehicle frame, and the other end is connected to an axle of the vehicle. The torque rod connectors usually permit rotation of the torque rod in several planes, and are often isolated from shock with elastomer bushings. The torque rods could be mounted parallel or perpendicular to the vehicle axle. There are some designs where the torque rods are mounted in a transverse or "V" pattern relative to the vehicle axle. In both cases, the torque rods prevent the axles from rotating about their own axis, moving fore-and-aft, and moving laterally.

Due to the severe loadings on torque rods, these items have traditionally been manufactured from steel rod, steel tubing, forgings, and castings. The current manufacturing methods, though, are costly. In addition, conventional torque rods are relatively heavy and because weight is of prime concern in the transportation industry, there are a variety of advantages to the elimination of excess weight.

Steel stampings have been considered. However, the end configurations required to support the torque rod connectors are difficult to form.

More recently, attempts have been made to manufacture torque rods using composite materials and molded polymers. These types of torque rods have disadvantages. For example, the materials are generally not strong enough to withstand the variety of loadings to which they are subjected. In some cases, the material is not rigid enough to provide the stability required on the vehicle. Some materials are subjected to impact damage, as one would expect from road gravel. Some molded torque rods with adequate strength are too bulky to fit the particular application. In addition, some molded torque rods are simply too expensive.

The present invention contemplates a steel reinforced filled polymer torque rod which overcomes the above-mentioned problems and others.

SUMMARY OF THE INVENTION

In accordance with one aspect of the present invention, a torque rod is disclosed which includes a reinforcement plate having a first bore and a second bore therethrough and a polymeric shell having at least a first end shell encasing at least the first bore and a second end shell encasing at least the second bore. The shell is of a different material than the reinforcement plate.

In accordance with a second aspect of the present invention, a method of manufacturing a torque rod is disclosed. The method includes the steps of forming a reinforcement plate and encasing at least a portion of the reinforcement plate in a polymeric shell. The shell is of a different material than the reinforcement plate.

In accordance with a third aspect of the present invention, a torque rod is disclosed which includes a stamped metal reinforcement plate including a first connector bore therethrough, a first annular flange surrounding the first connector bore, a second connector bore therethrough, a second annular flange surrounding the second connector bore, a depression extending axially between the first connector bore and the second connector bore, and an end flange circumferentially surrounding an end surface of said reinforcement plate. The torque rod also includes a polymer shell including a first connector portion encasing the first connector bore and first annular flange, a second connector portion encasing the second connector bore and second connector flange, and end wall encasing the end flange, and a number of side walls encasing the depression.

It is, therefore, an object of the present invention to provide a new and improved steel reinforced molded torque rod which eliminates the need to machine torque rod ends, and also eliminates the need to weld the torque rod.

It is another object of the present invention to provide a torque rod with improved strength in tension and compression and improved strength in torsion when compared to a torque rod formed of a homogeneous material.

It is a further object of the present invention to provide a torque rod which weighs less than presently used torque rods and which reduces the incidence of failure due to damaged polymer, the incidence of failure due to fatigue propagating from surface damage, the bulk or volume of the torque rod, and the consumption of polymer when compared to a torque rod formed of a homogeneous material.

Still yet another object of the present invention is to provide a torque rod which lowers manufacturing costs, provides flexibility in manufacturing a variety of torque rod lengths, and improves security against catastrophic failure of the torque rod.

Still other advantages and benefits of the invention will become apparent to those skilled in the art upon a reading and understanding of the following detailed description.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
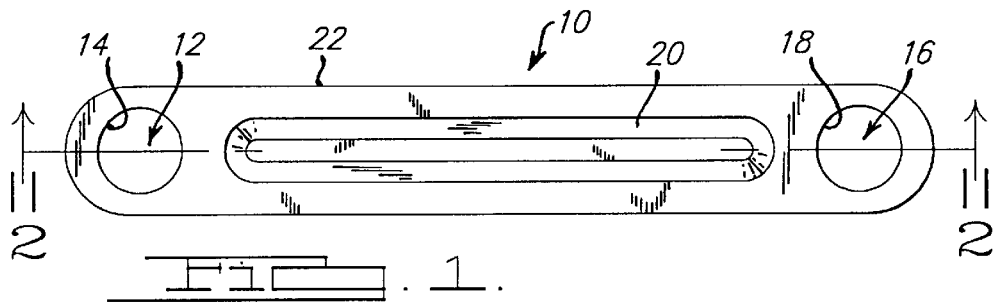
FIG. 1 is an elevational view of a stamped metal reinforcement plate for use with the present invention.
Figure 2:
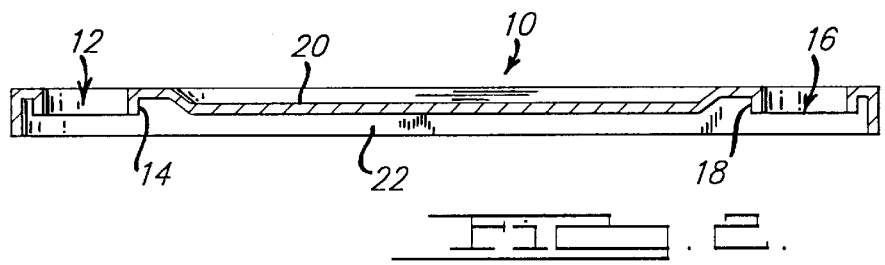
FIG. 2 is a cross-sectional view of the stamped metal reinforcement plate taken along the line 2—2 of FIG. 1.
Figure 3:
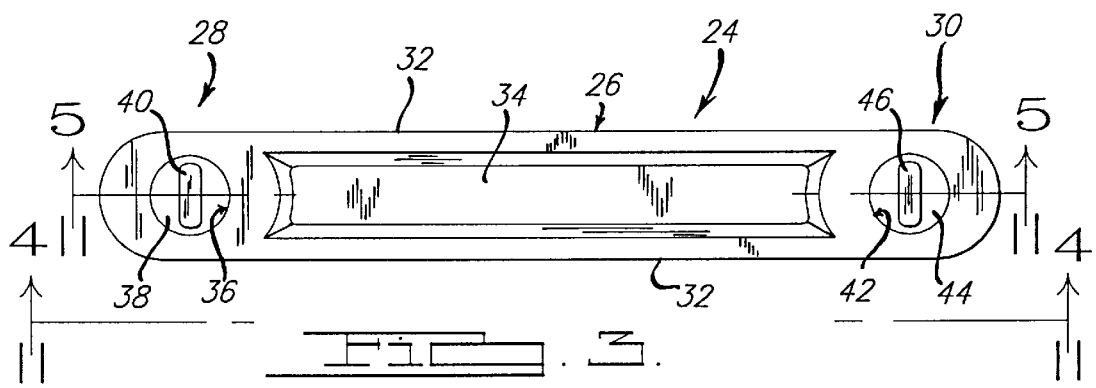
FIG. 3 is an elevational view of a steel reinforced molded torque rod which incorporates the feature of the present invention therein.
Figure 4:
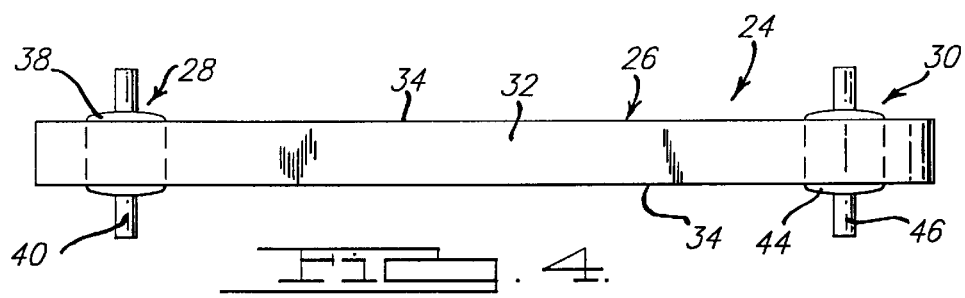
FIG. 4 is a top view of the steel reinforced molded torque rod taken along the line 4—4 of FIG. 3.
Figure 5:
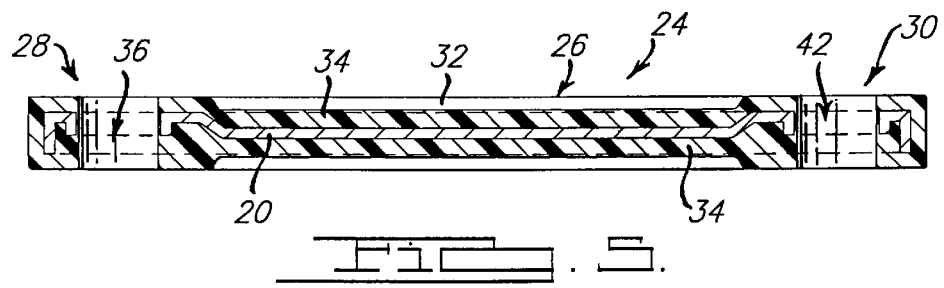
FIG. 5 is a cross—section view of the steel reinforced molded torque rod taken along the line 5—5 in FIG. 3.
Figure 6:
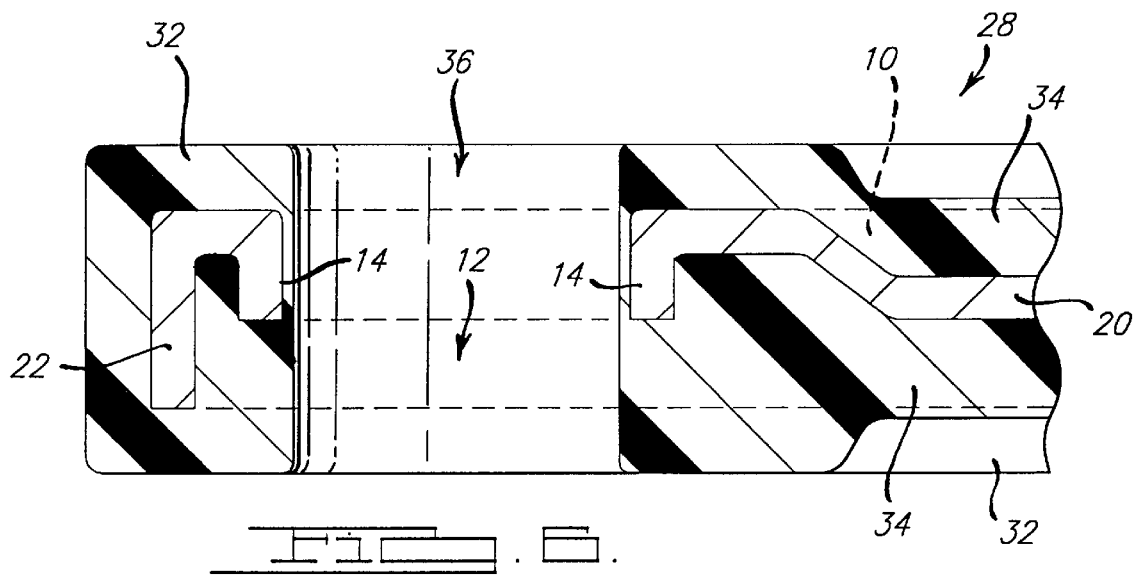
FIG. 6 is an enlarged partial cross-sectional view of an end connector of the steel reinforced molded torque rod shown in FIG. 5.

Referring now to FIGS. 1 and 2, there is shown an exemplary stamped metal reinforcement plate 10. The reinforcement plate 10 includes a first connector bore 12 surrounded by a first annular flange 14, a second connector bore 16 surrounded by a second annular flange 18, a depression 20 extending axially between the first connector bore 12 and second connector bore 16, and a continuous end flange 22 circumferentially surrounding the ends of the reinforcement plate 10. The first annular flange 14, second annular flange 18, depression 20 and end flange 22 serve to stiffen the reinforcement plate 10. While the reinforcement plate 10 is generally referred to as a stamping, it should be appreciated that other types of techniques could be used to form the reinforcement plate 10, such as casting and forging. In addition, other types of material could be used to form the reinforcement plate 10 such as rod steel and tubing steel. It should also be appreciated that the reinforcement plate 10 may take various forms and include other flanges, depressions, and ribs to strengthen the reinforcement plate 10 in the same manner as the annular flanges 14, 18, depression 20, and end flange 22.

Referring now to FIGS. 3–6, there is shown a first embodiment of a steel reinforced molded torque rod 24 which incorporates the features of the present invention therein. The torque rod 24 includes a polymer shell 26 which completely encases, or otherwise surrounds the stamped metal reinforcement plate 10. The polymer shell 26 includes a first connector portion 28, second connector portion 30, continuous end wall 32, and side walls 34. The first connector portion 28, second connector portion 30, end wall 32 and side walls 34 substantially conform to the contours of the stamped metal reinforcement plate 10.

The connector portion 28 includes a connector bore 36 which is adapted to receive and retain therein an elastomeric bushing 38 associated with a connector bar 40 which may be attached to a vehicle frame or a vehicle axle. Likewise, the second connector portion 30 includes a connector bore 42 which is adapted to receive and retain therein an elastomeric bushing 44 associated with a connector bar 46 for connecting to a vehicle frame or a vehicle axle.

The stamped metal reinforcement plate 10 serves to provide extra strength in tension, compression and in torsion to the torque rod 24. The molded exterior polymer shell 26 supplements the strength of the reinforcement, plate 10 while eliminating many of the costly fabrication and machining operations. The molded exterior polymer shell 26 may consist of a number of different materials. However, a fiber-filled molded polymer is believed to be suitable for most applications. In particular, the molded exterior polymer shell 26 may be formed from a carbon or glass fiber filled polyphthalamide, polyetherimide, or polyethersulfone. In addition, the molded exterior polymer shell 26 may be formed from a polyamide polymer such as nylon, a polyester elastomer such as HYTREL (commercially available from Du Pont de Nemours, E. I. & Co.), or an acetal resin such as DELRIN (commercially available from Du Pont de Nemours, E. I. & Co.).

The stamped metal reinforcement plate 10 not only provides strength, but also reduces the total volume of polymer that is required to manufacture the torque rod 24. This volume reduction is due to the displacement of the polymer by the reinforcement plate 10, as well as the overall reduction in size that results from the improved strength characteristics of the design. Thus, the size of the torque rod 24 is reduced when compared to a similar design of homogeneous material.

It should be appreciated that the design of the torque rod 24 may vary in the type of reinforcement and amount of molded material used, depending upon the particular application. For instance, in some cases, the polymer shell 26 would not be needed for strength. Thus, the polymeric material could be molded only around the ends of the reinforcement plate 10 in order to eliminate fabricating and machining costs.

Figure 7:
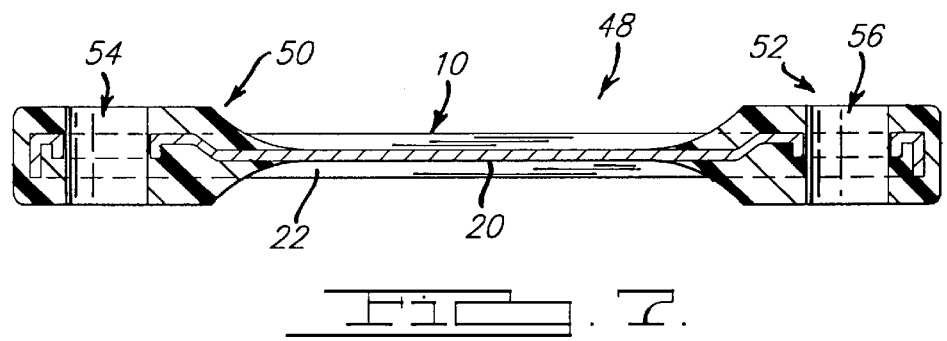
FIG. 7 is a cross-sectional view of a second embodiment of a steel reinforced molded torque rod which incorporates the features of the present invention therein.

In this regard, FIG. 7 shows a second embodiment of a steel reinforced molded torque rod 48 which includes the stamped metal reinforcement plate 10 only partially molded within a first polymeric end shell 50 and a second polymeric end shell 52. As with the first connector portion 28 (FIG. 3), the first polymeric end shell 50 includes a connector bore 54 therethrough for receiving an elastomeric bushing (not shown). The first polymeric end shell 50 completely surrounds or encases the first connector bore 12, and first annular flange 14. The first polymeric end shell 50 may also surround or encase at least a portion of the depression 20 and end flange 22. Likewise, the second polymeric end shell 52 includes a connector bore 56 therethrough for receiving an elastomeric bushing (not shown). The second polymeric end shell 52 completely encases or otherwise surrounds the second connector bore 16, and second annular flange 18. The second polymeric end shell 52 may also surround or encase at least another portion of the depression 20 and end flange 22.

Figure 8:
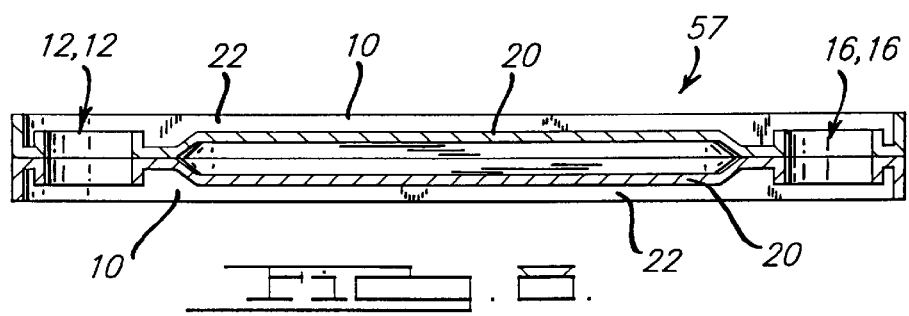
FIG. 8 is a cross-sectional view of a second embodiment of a stamped metal reinforcement plate for use with the present invention.
Figure 9:
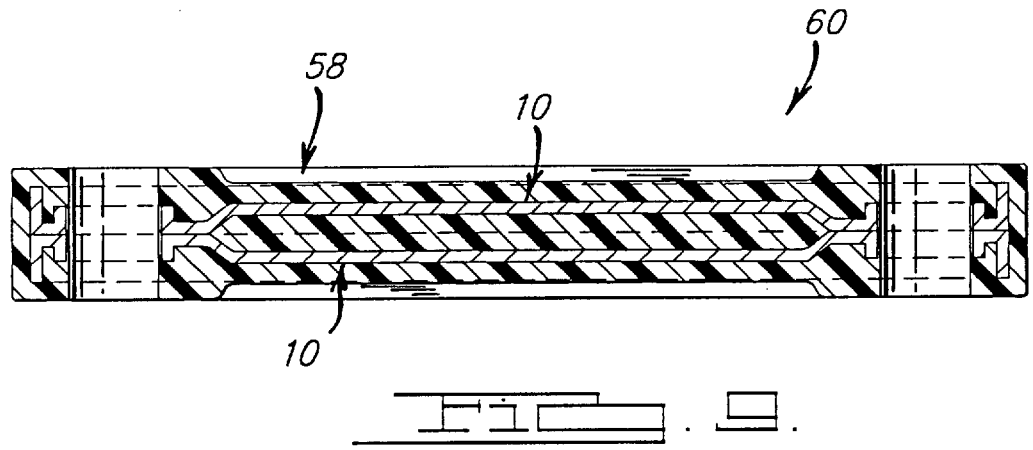
FIG. 9 is a cross-sectional view of a third embodiment of a steel reinforced molded torque rod which incorporates the stamped metal reinforcement plate shown in FIG. 8.

For heavier applications, as shown in FIGS. 8 and 9, two stamped metal reinforcement plates 10 may be secured together in a back-to-back arrangement to form a single reinforcement plate 57 which is molded or encased within a single homogeneous molded polymer shell 58. The stamped metal reinforcement plates 10 may be attached together in a conventional manner, such as welding or riveting, prior to being encased in the single polymer shell 58. The resulting torque rod 60 may have the same structural attributes as described above with regard to the torque rod 24. In particular, the single reinforcement plate 57 has a first bore and a second bore therethrough, and a polymeric shell 58 having at least a first end shell portion encasing at least the first bore and a second end shell portion encasing at least the second bore. The single reinforcement plate 57 includes a first reinforcement plate portion 10 having a third bore 12 and a fourth bore 16 therethrough, and a second reinforcement plate 10 having a fifth bore 12 and a sixth bore 16 therethrough. The second reinforcement plate portion 10 is secured to the first reinforcement plate portion 10 such that the third bore 12 cooperates with the fifth bore 12 to define the first bore and the fourth bore 16 cooperates with the sixth bore 16 to define the second bore.

Figure 10:
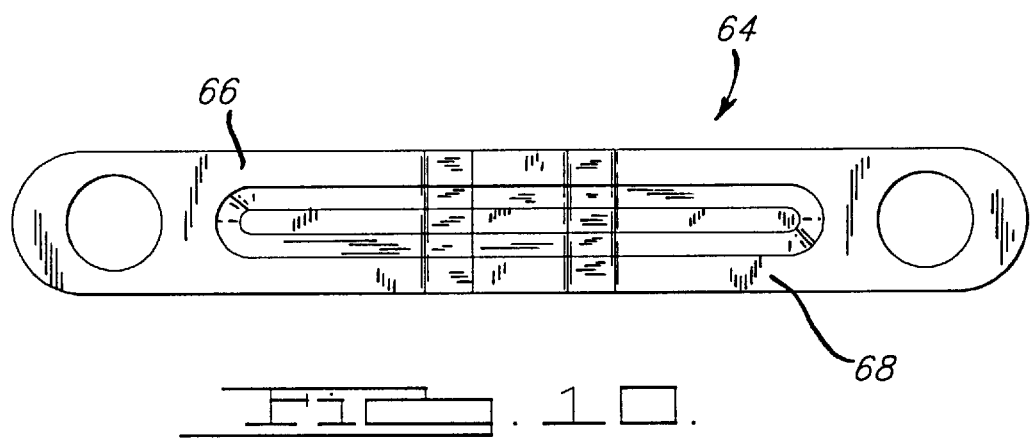
FIG. 10 is an elevational view of a third embodiment of a stamped metal reinforcement plate which incorporates the features of the present invention therein.
Figure 11:
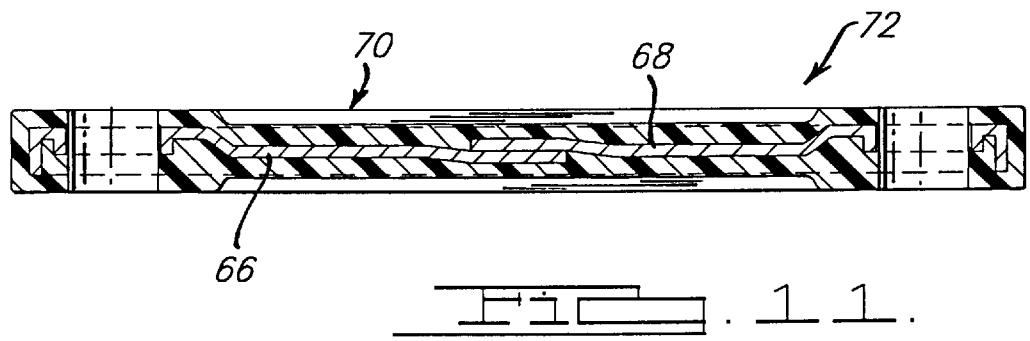
FIG. 11 is a cross-sectional view of a fourth embodiment of a steel reinforced molded torque rod which incorporates the stamped metal reinforcement plate shown in FIG. 10.

While there are many high volume applications where a fixed length torque rod is appropriate, there is a need for smaller volumes of torque rods having different lengths. In this case, as shown in FIGS. 10 and 11, a reinforcement plate 64 may be formed by joining a first stamped metal reinforcement plate portion 66 to a second stamped metal reinforcement plate portion 68. In the embodiment being described, the first stamped metal reinforcement plate portion 66 may be attached to the second stamped metal reinforcement plate portion 68 in a conventional manner such as welding or riveting to form a reinforcement plate 64 of a desired length. Once the first reinforcement plate portion 66 is joined to the second reinforcement plate portion 68, the reinforcement plate 64 may be molded or otherwise encased within a single polymer shell 70 to form a steel reinforced molded torque rod 72 having the same structural attributes as described above with regard to the torque rods 24, 48.

Thus, in the most simple form, a single stamped metal reinforcement plate may be at least partially encased within a molded polymer shell to form the torque rod. The reinforcement plate may be conventionally molded or encased within the polymeric shell. However, the preferred method of molding or encasing a reinforcement plate within the polymeric shell is to injection mold the polymeric shell around the reinforcement plate.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalence thereof.

Having thus described the invention, I now claim:

1. A torque rod for a vehicle, said torque comprising:
   a reinforcement plate having a first bore and a second bore therethrough; and
   a polymeric shell having a first end shell encasing said first bore, the first end shell defining a first connector bore for fixedly attaching the torque rod to the vehicle and a second end shell said second bore, the second end shell defining a second connector bore for fixedly attaching the torque rod to the vehicle, the shell being of a different material than the plate, said reinforcement plate increasing the tensile, compression and torsional strength of said first and second connector bores of said polymeric shell.

2. The torque rod of claim 1, wherein said polymeric shell completely encases said reinforcement plate.

3. The torque rod of claim 2, wherein said reinforcement plate includes a first reinforcement plate portion having a third bore and a fourth bore therethrough, and a second reinforcement plate having a fifth bore and a sixth bore therethrough, wherein said second reinforcement plate is secured to said first reinforcement plate such that said third bore cooperates with said fifth bore to define said first bore and said fourth bore cooperates with said sixth bore to define said second bore.

4. The torque rod of claim 2, wherein said reinforcement plate includes a first reinforcement plate portion having said first bore therethrough and a second reinforcement plate portion joined to said first reinforcement plate portion and having said second bore therethrough.

5. The torque rod of claim 1, wherein said reinforcement plate includes a depression extending axially between said first bore and said second bore, a first flange surrounding said first bore, a second flange surrounding said second bore, and an end flange extending from an end surface of said reinforcement plate.

6. The torque rod of claim 1, wherein reinforcement plate is formed from at least one steel material selected from the group consisting of stamped steel, cast steel, forged steel, tubular steel, and rod steel.

7. The torque rod of claim 1, wherein said polymeric shell is formed from at least one polymeric material selected from the group consisting of polyphthalamide, polyetherimide, and polyethersulfone.

8. The torque rod of claim 7, wherein said polymeric shell is also formed from at least one fiber material selected from the group consisting of carbon fiber and glass fiber.

9. The torque rod of claim 1, wherein said polymeric shell is formed from at least one polymeric material selected from the group consisting of a polyamide polymer, a polyester elastomer, and an acetal resin.

10. A torque rod for a vehicle, said torque rod comprising:
    a stamped metal reinforcement plate including a first bore therethrough, a first annular flange surrounding said first bore, a second bore therethrough, a second annular flange surrounding said second bore, a depression extending axially between said first bore and said second bore, and an end flange circumferentially surrounding an end surface of said reinforcement plate;
    a polymer shell including a first connector portion encasing said first bore and said first annular flange, the first connector portion defining a first connector bore for fixedly attaching the torque rod to the vehicle, a second connector portion encasing said second bore and said second connector flange, the second connector portion defining a second connector bore for fixedly attaching the torque rod to the vehicle, an end wall encasing said end flange, and a plurality of side walls encasing said depression, said reinforcement plate increasing the tensile, compression and torsional strength of said first and second connector bores of said polymeric shell.

11. The torque rod of claim 10, wherein said polymeric shell is formed from at least one polymeric material selected from the group consisting of polyphthalamide, polyetherimide, polyethersulfone, polyamide polymer, polyester elastomer, and acetal resin; and wherein said polymeric shell is further formed from at least one fiber material selected from the group consisting of carbon fiber and glass fiber.

* * * * *